US006612168B2

(12) United States Patent
Barr et al.

(10) Patent No.: US 6,612,168 B2
(45) Date of Patent: *Sep. 2, 2003

(54) EXPLOSION PROOF MAGNETOSTRICTIVE PROBE

(75) Inventors: Rodney Barr, Cary, NC (US); Michael L. Gloden, Apex, NC (US); Arnold Fred Sprecher, Jr., Raleigh, NC (US)

(73) Assignee: MTS Systems Corporation, Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,615

(22) Filed: Mar. 10, 1997

(65) Prior Publication Data

US 2001/0052772 A1 Dec. 20, 2001

Related U.S. Application Data

(63) Continuation-in-part of application No. 08/500,004, filed on Jul. 10, 1995, now Pat. No. 5,736,855, and a continuation-in-part of application No. 08/439,502, filed on May 11, 1995, now abandoned.

(51) Int. Cl.[7] .......................... G01F 23/30; G01B 7/14; G01D 5/48; H05K 5/06
(52) U.S. Cl. ............... 73/209 V; 73/290 R; 73/DIG. 2; 174/52.2; 324/207.13; 324/207.24
(58) Field of Search ............... 324/207.13, 207.17, 324/207.22, 207.24; 73/290 R, 290 V, 313, 314, 319, DIG. 2; 333/148; 174/52.2

(56) References Cited

U.S. PATENT DOCUMENTS

| 3,898,555 | A | * | 8/1975 | Tellerman | 324/207.13 |
| 4,768,615 | A | * | 9/1988 | Steinebrunner et al. | |
| 4,952,873 | A | * | 8/1990 | Tellerman | 324/207.13 |
| 5,136,884 | A | * | 8/1992 | Lovett | 324/207.13 X |
| 5,163,323 | A | * | 11/1992 | Davidson | 73/290 V |
| 5,189,911 | A | * | 3/1993 | Ray et al. | 324/207.13 X |
| 5,274,328 | A | * | 12/1993 | Begin et al. | 324/207.13 X |
| 5,313,160 | A | * | 5/1994 | Gloden et al. | 324/207.13 |
| 5,535,625 | A | * | 7/1996 | Levy | 73/290 V |
| 5,590,091 | A | * | 12/1996 | Gloden et al. | 324/207.13 X |
| 5,627,380 | A | * | 5/1997 | Crowne | 73/313 X |
| 5,640,880 | A | * | 6/1997 | Mulrooney et al. | 73/313 |
| 5,723,870 | A | * | 3/1998 | Crowne et al. | 73/314 X |
| 5,730,025 | A | * | 3/1998 | Getman et al. | 73/290 V |
| 5,736,855 | A | * | 4/1998 | Smith et al. | 324/207.13 |

* cited by examiner

Primary Examiner—Gerard Strecker
(74) Attorney, Agent, or Firm—David M. Ostfeld

(57) ABSTRACT

A magnetostrictive application probe is disclosed wherein the probe includes a preassembled sensor element mounted as an application housing installation as an installable unit. The modular nature allows interchanging with various electronic assemblies, and may be an explosion proof installation.

17 Claims, 11 Drawing Sheets

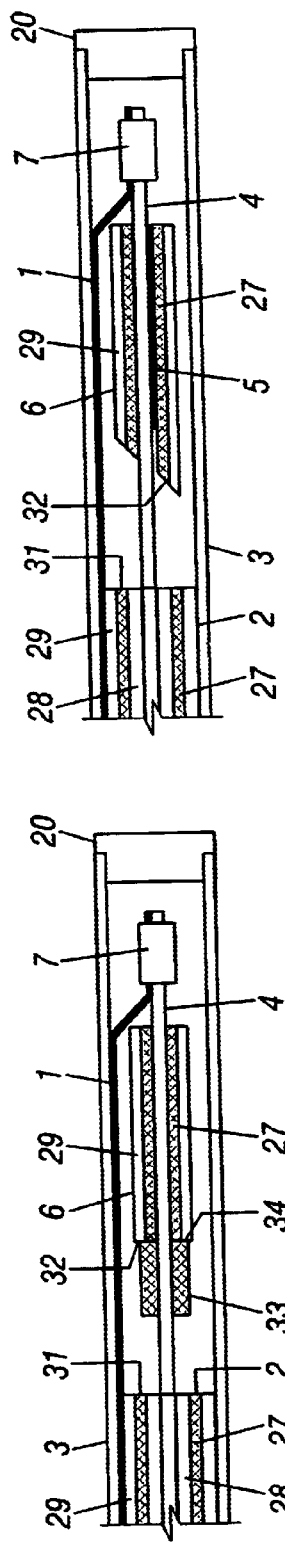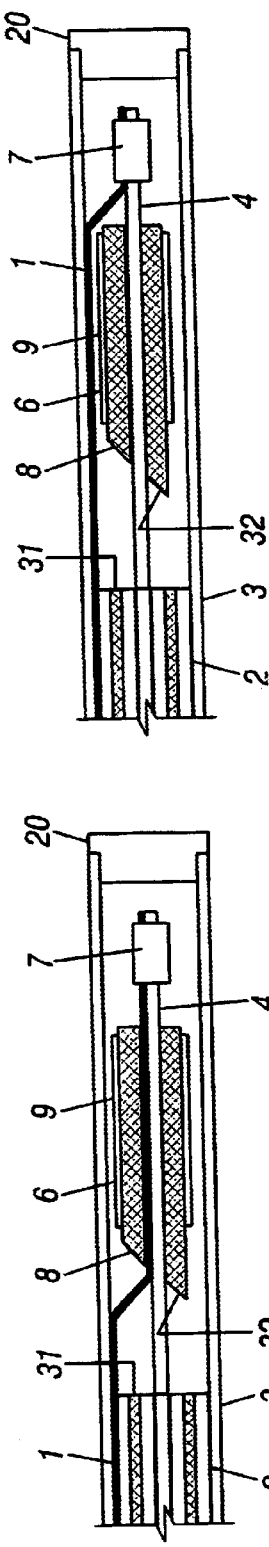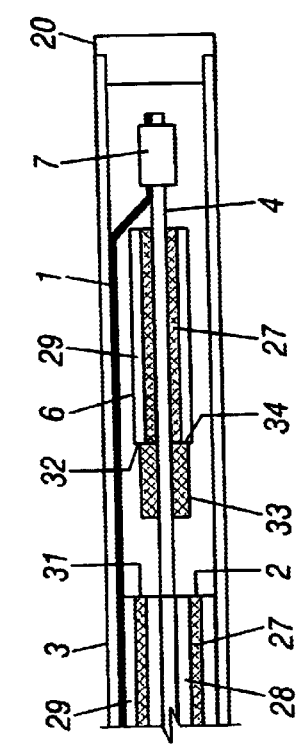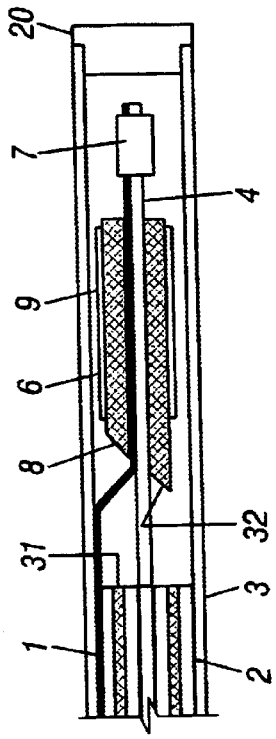

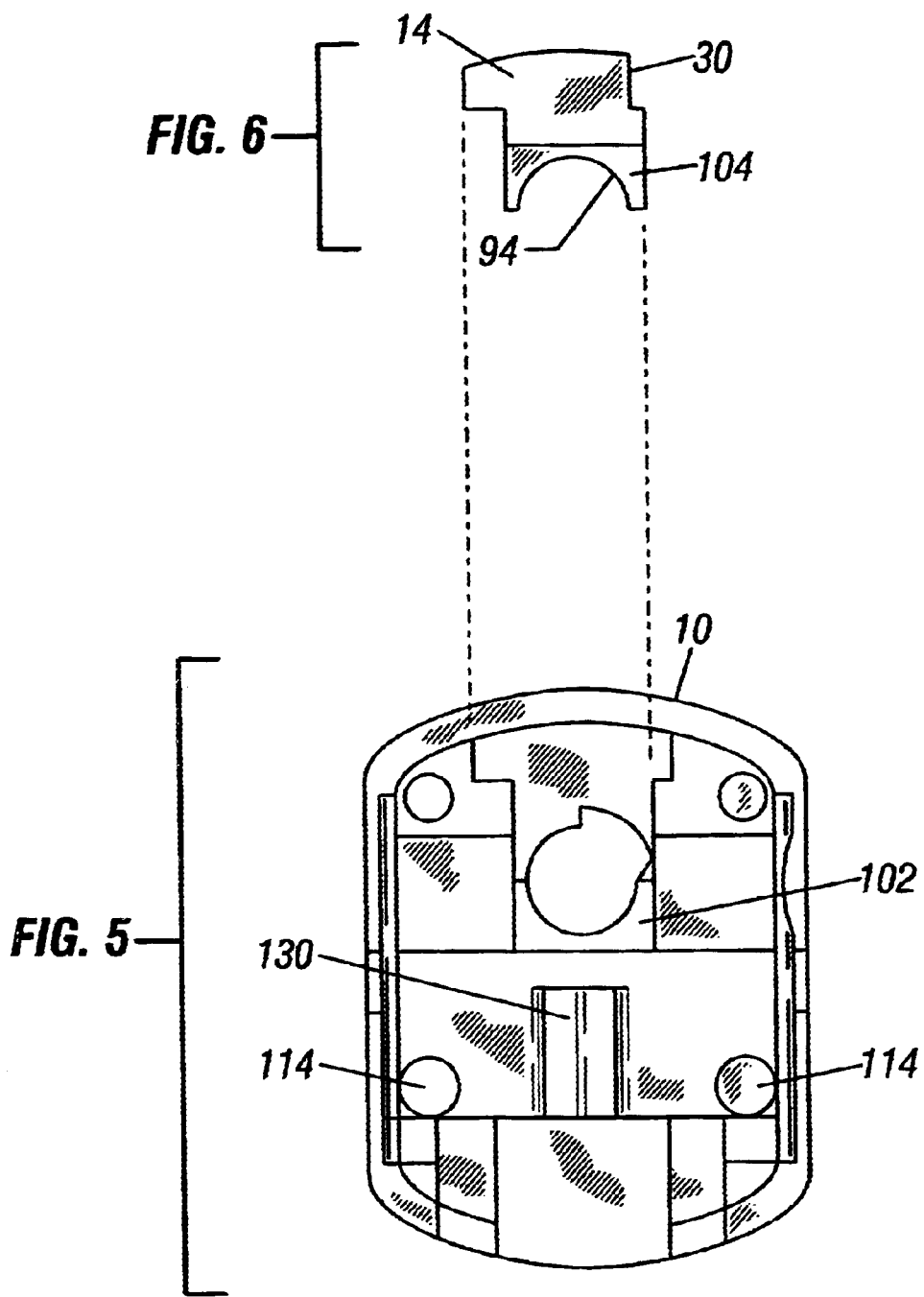

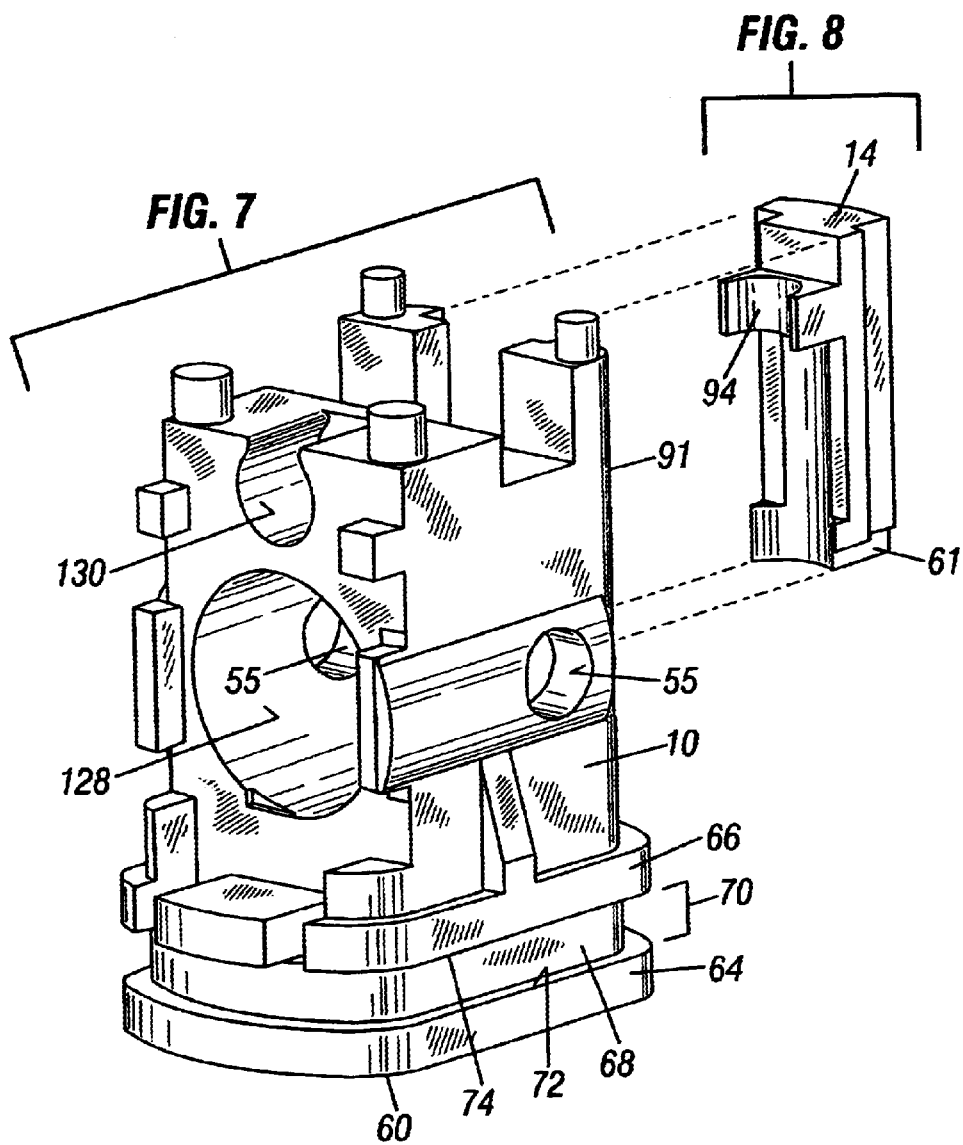

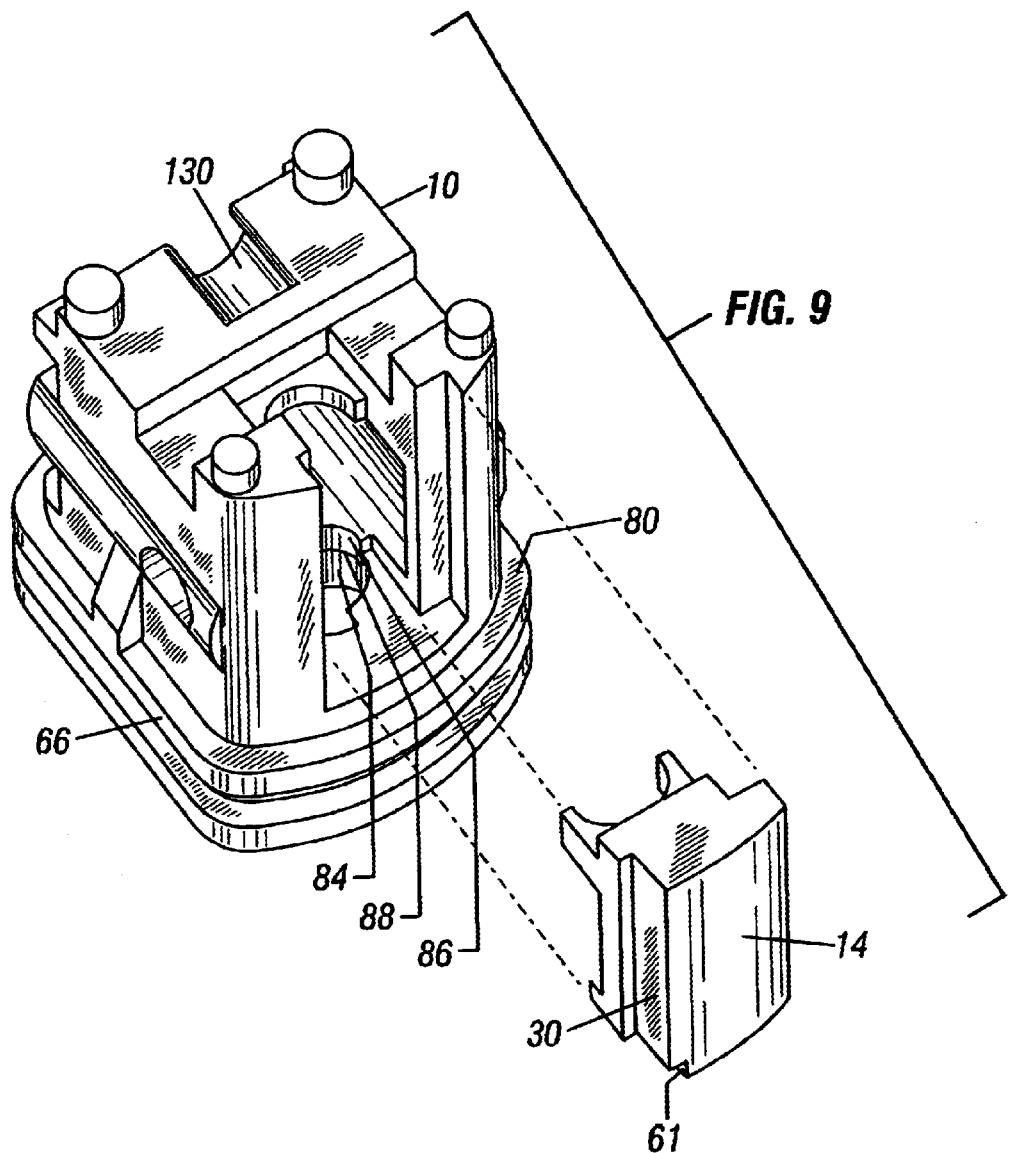

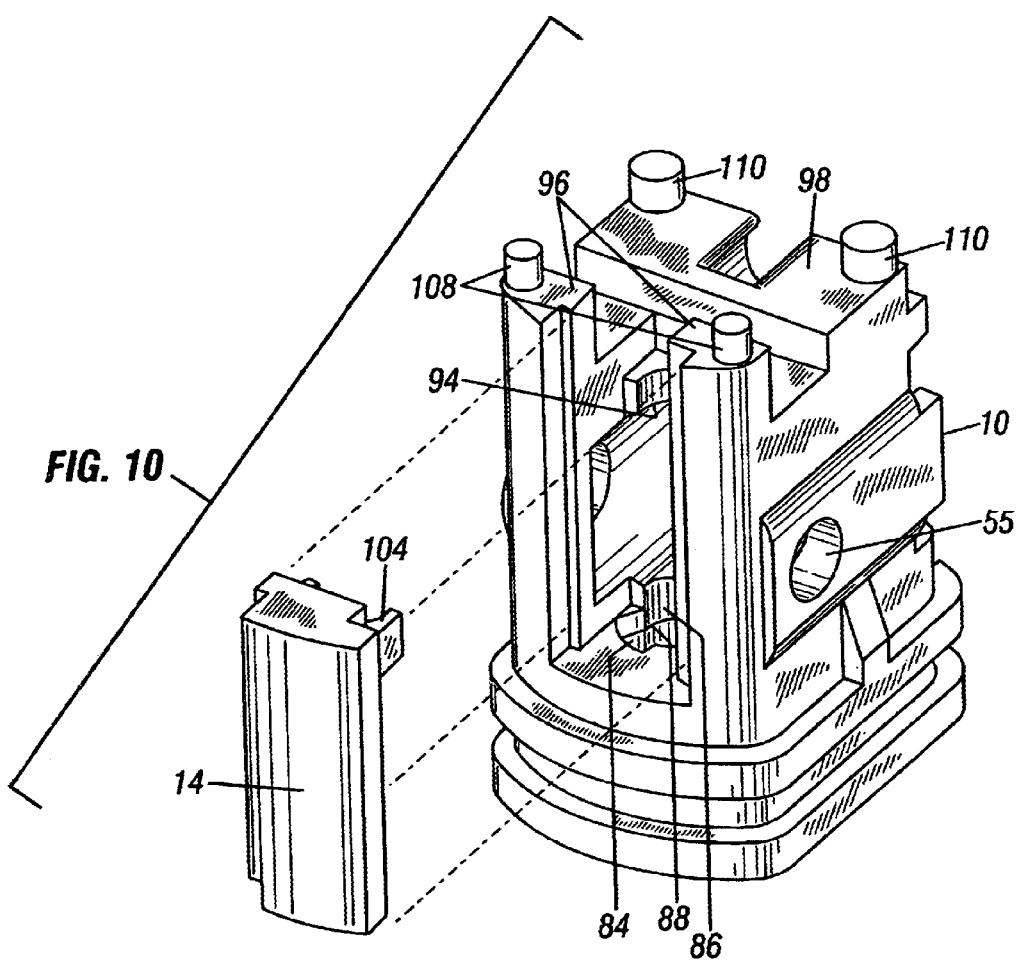

EXPLOSION PROOF MAGNETOSTRICTIVE PROBE

CROSS REFERENCE TO RELATED APPLICATION

This application is a continuation-in-part of U.S. application Ser. No. 08/500,004 filed Jul. 10, 1995, which issued to U.S. Pat. No. 5,736,855, and is also a continuation-in-part of U.S. Application Ser. No. 08/439,502 filed May 11, 1995, which is now abandoned, both of which prior applications are entitled "Local Buffer Circuit".

BACKGROUND OF THE INVENTION

1. Field of the Invention

The present invention relates to magnetostrictive displacement or distance measuring transducers, and more particularly to magnetostrictive transducers having modular construction including for displacement or distance measuring and adapted for easy configuration of assembly of field equipment after manufacture or assembly from stocked modules. This construction also facilitates modular construction of an explosion-proof field device.

2. Description of the Art

Magnetostrictive transducers having elongated waveguides that carry torsional strain waves induced in the waveguide when current pulses are applied along the waveguide through a magnetic field are well known in the art. A typical linear distance measuring device using a movable magnet that interacts with the waveguide when current pulses are provided along the waveguide is shown in U.S. Pat. No. 3,898,555.

Devices of the prior art of the sort shown in U.S. Pat. No. 3,898,555 also have the sensor element embedded into the protective housing which also houses the electronics to at least generate the pulse and provide certain mounting means associated with the device for the customer.

U.S. Pat. No. 5,313,160 teaches a modular design in which the sensor and electronic assembly can be removed from the application package. In the application package is the outer housing which is used by the customer for mounting an attachment of the sensor and electronics assembly with the end device whose position is to be measured. Sensor designs of the past have required delicate handling until the fabrication of the total unit, including the outer housing and electronics, has been completed. Prior art also utilizes difficult to produce and expensive methods to suspend the waveguide and to prevent the reflection of the desired sonic strain wave. Prior high performance waveguide suspension systems utilize thin elastomer spacer discs which are individually positioned along the entire length of the waveguide. Installation of the discs is a time consuming, usually manual, operation. The best performing damping devices in use utilize molded rubber elements with a central hole. These are difficult to mold and time consuming to apply.

The prior art has deficiencies in that the electronics are included within the waveguide suspension device and an expensive means for waveguide suspension is utilized. The prior art also has deficiencies by not having modular construction and pre-assembled sensor elements. Further if different sizes are needed, the unit must be removed. But in the prior art, the sensor and the electronic package were not removable and interchangeable because of the application electronics being attached.

It is an object of the present invention to provide for an easy configuration or assembly of field equipment after manufacture or assembly from stocked modules, including modular construction of an explosion proof sensor.

It is a further object of the present invention to remotely locate the sensor from the electronics.

SUMMARY OF THE INVENTION

The present invention relates to a modularly constructed magnetostrictive transducer of the sort set out in U.S. application Ser. No. 08/500,004 filed Jul. 10, 1995, having a modular constructed magnetostrictive transducer, permitting a pre-assembled sensor element. A sensor cartridge which may be used as an explosion proof probe and which is environmentally protected and mechanically strong for direct use in process control applications is disclosed. The outer housing can be made from any weldable metal, and a sheet of teflon or other plastic can be added, if needed for chemical resistance. The pre-assembled sensor elements allow easy configuration or assembly of field equipment after manufacture or assembly of the sensor element. It also permits potting for environmental seal and explosion proof construction. The transducer would be then a rugged component, and may be equipped with threading to thread to another explosion proof housing which contains the mating electronics. For explosion proof configurations, the explosion proof material is anchored within the housing to be held in place when exposed to higher pressures.

DESCRIPTION OF THE DRAWINGS

For a further understanding of the nature and objects of the present invention, reference should be had to the following figures in which like parts are given like reference numerals, and wherein:

FIG. 2a is a cross-sectional view of the sensing element assembly of the preferred embodiment of the present invention of FIG. 1 taken along section lines 2—2 of FIG. 1 showing a portion of the waveguide and surrounding sleeves showing the damping element at the end of the waveguide;

FIG. 2b is the same cross-sectional view of FIG. 2a, but showing a first alternative of using a tuning wire between the damping element and the waveguide;

FIG. 2c is the same cross-sectional view as FIG. 2a, but shows a second alternative of external tube crimped over the damping element;

FIG. 2d is the same cross-sectional view of FIG. 2a, but shows a third alternative of the return wire in a different position and with an external tube crimped over the damping element;

FIG. 5 is a plan view of the bracket of the preferred embodiment of the present invention;

FIG. 6 is a plan view of the bracket cover of the preferred embodiment of the present invention;

FIG. 7 is a first profile view of the bracket of the preferred embodiment of the present invention;

FIG. 8 is a first profile view of the bracket cover of the preferred embodiment of the present invention;

FIG. 9 is a second profile view of the bracket of the preferred embodiment of the present invention showing it juxtaposed with the bracket cover of the preferred embodiment of the present invention;

FIG. 10 is a third profile view of the bracket of the preferred embodiment of the present invention showing the bracket cover juxtaposed;

DETAILED DESCRIPTION OF THE PREFERRED EMBODIMENT

A transducer or sensing element assembly of the type disclosed in U.S. application Ser. No. 08/500,004, filed Jul. 10, 1995, the disclosure of which is partially repeated below, or any other modular transducer that may be introduced in the future for purposes of permitting the production of easily assembled field equipment including explosion proof transducers, is shown indicated at 25 in FIG. 16. Transducer 25 is preassembled as a sensing element and may be used for measuring displacements and/or distances or other measurements, and the field assembled device of the present invention will be applicable to any of them. The type of transducer that may be used for the present invention should not be considered to be limited by the type of modular construction for pre-assembly use with the probe, including the preferred embodiment described below. The transducer and assembled sensor element should not be deemed to be limited to any particular type of electronics used with the waveguide. Additionally, the general type and nature of a transducer in electrically producing the return pulse and interfacing through the return pulse with any electronics of a buyer or user of the device, except that it be pre-assembled, should not be deemed to be limited by the disclosure.

The type of transducer that may be used for the present invention, should not be considered to be limited by the disclosure of the damping element used with the transducer. Further, except for mechanical construction indicating a preferred mechanical mounting of the waveguide, the general type of transducer should not be deemed to be limited by the disclosure of the waveguide suspension. The transducer should not be deemed to be limited to any particular type of electronics used with the waveguide except for the local buffer circuit. Additionally, the general type and nature of a transducer in electrically producing the return pulse and interfacing through the return pulse with any electronics of a buyer or user of the device should not be deemed to be limited by the disclosure except for the mechanical construction shown for the preferred embodiment and the printed circuit board containing the local buffer circuit.

Figure 1:
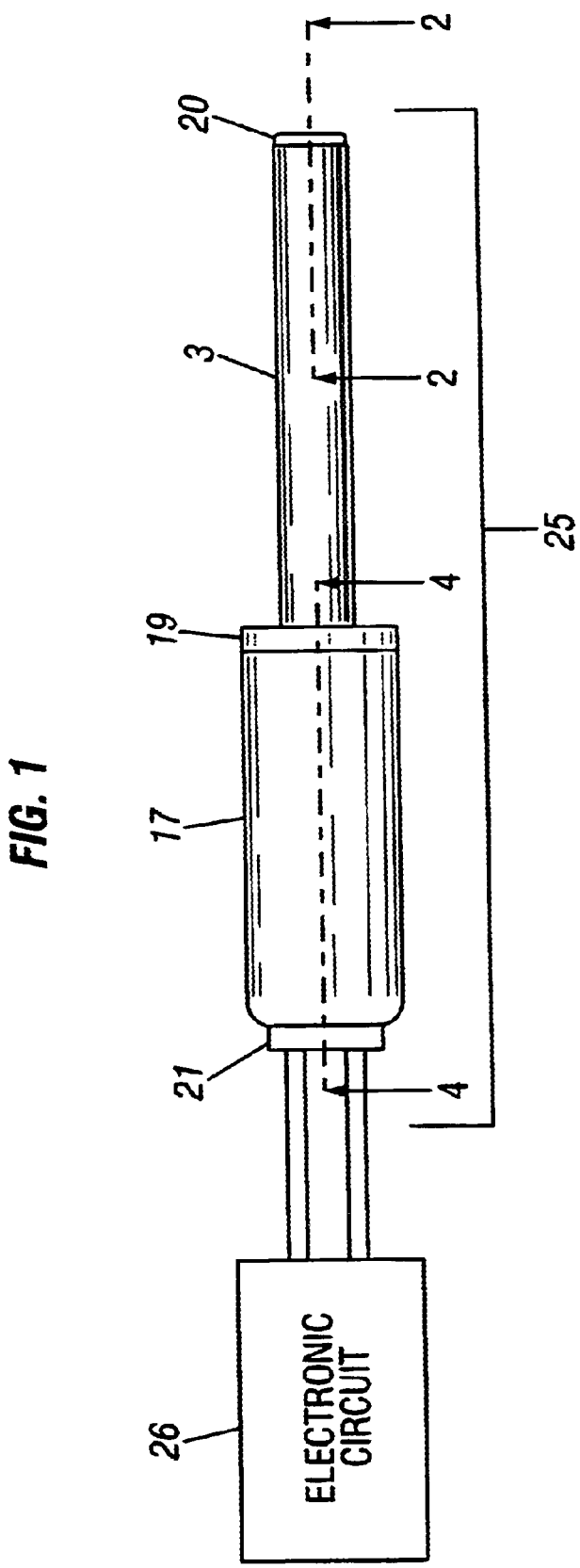
FIG. 1 depicts a side elevated view of the complete sensing element assembly.

As shown if FIG. 1 transducer 25 includes an elongated waveguide assembly enclosed in an enclosure tube 3. Enclosure tube 3 and the waveguide assembly are mechanically supported at one end by a housing 17 through an end flange 19. The waveguide assembly includes the outer enclosure tube 3 surrounding a coaxial elongated interior waveguide 4 (FIG. 2). Whenever "FIG. 2" is referenced in this specification, it means any of the embodiments of FIGS. 2*a*–2*d*. A current is passed through the waveguide 4 and returns through a return wire 1 electrically connected to the waveguide 4. Typically, a magnet (not shown) is mounted over the waveguide assembly and enclosure tube 3 by being placed over and coaxial with enclosure tube 3. The magnet interacts with the current pulse as more completely described in U.S. Pat. No. 3,898,555. Upon the strain wave pulse returning to the housing 17 after passing through the waveguide 4 and return wire 1, the placement of waveguide 4 and return wire 1 being more completely described below, a suitable mode converter (partially shown) of any type known or to be known in the art provides an electrical signal through connector 21 to any electronic circuit connected to it, such as electronic circuit 26.

The structure of the circuit 26 is dependent on the use of transducer 25, and will work with the waveguide suspension sleeve 2 and modular construction elements of the present invention despite disparities in structure. The structure of circuit 26 should not be considered as limiting the invention. Thus, no particular mechanism for the arrangement of the element 26 or any conditioning of the signal to circuit 26 is shown to be preferred to emphasize generality. Further, it should be understood that the waveguide suspension sleeve 2 mechanism of the present invention is applicable to any transducer 25 and waveguide 4 of the type for measuring displacement and/or distance and/or other measurement using the magnetostrictive principles, such as generally shown in U.S. Pat. No. 3,898,555, but is dependent for modular assembly to some extent on the mechanical arrangement of elements in housing 17. Thus, for example, a particular mechanism for a preference for the arrangement of the elements in the housing 17 is shown to be preferred for mounting, but otherwise should not limit generality. The mechanism other than mounting may be of any sort, including such as those shown in U.S. Pat. No. 3,898,555 or others known in the art or still to be thought of in the art or that are in design in the art. For this same reason, the type of magnet used and the type of application used is also not shown, and may be any application. Finally, because there is some need to show the interaction between the damping element 6 (FIG. 2) and the waveguide suspension sleeve 2 and other portions of transducer 25 at the remote portion of the waveguide assembly, a preferred embodiment for an enclosure tube 3 (FIG. 2), discussed below, with the waveguide suspension sleeve 2 and damping element 6 is shown. This should not be considered as limiting but only illustrative, the waveguide suspension sleeve 2 being capable of use with any type of waveguide assembly as set out above.

The remote end portion of enclosure tube 3, remote from housing 17, is shown in cross-section in FIG. 2 and ends with an end plug 20. An inert gas may be introduced in enclosure tube 3 to further promote isolation and sealing. End plug 20 acts to stop fluid and other materials from entering enclosure tube 3. The end of the waveguide assembly having end plug 20, is normally the end which would be at the bottom of a tank, if transducer 25 is being used for determining the level of liquid in a tank, or at the end of the displacement if the transducer 25 were used to measure distance. As discussed in the Background, it is desired to make the dead zone, or non-signal producing zone, adjacent to the end plug 20 as short as possible and yet accomplish the purpose of dampening the sonic strain wave signal to prevent reflected strain waves from interfering with the desired return strain wave signal that represents distance or level, such as discussed in U.S. Pat. No. 3,898,555.

As shown in FIG. 2, a waveguide 4 is enclosed through concentrically layered enclosure mechanisms, including a suspension sleeve 2 and enclosure tube 3. The suspension sleeve 2 comprises a tubular braided sleeve, or elastomer sleeve, or composite sleeve, of a geometry having the characteristics of restricting the lateral movement of the waveguide 4 and insulating the waveguide 4 from vibration and external sonic noise yet not contacting the waveguide 4 so much as to damp the sonic strain wave signal generated by the interaction of the electric current and external magnet. Suspension sleeve 2 is coaxial with and surrounds the waveguide 4 for substantially its entire length, or at least a major portion thereof. Suspension sleeve 2 is shown mounted within and coaxial for substantially the entire length of waveguide 4, or at least a major portion thereof, with outer enclosure tube 3.

The inner diameter of the suspension sleeve 2 must be small enough to limit the movement of the waveguide 4 yet large enough so that it does not hold, grab, constrict or otherwise compress the waveguide 4. If suspension sleeve 2 compresses, holds, grabs or constricts the waveguide 4, attenuation of the sonic strain wave signal along waveguide 4 will occur. The Wiedemann Effect does not promote a large sonic strain wave signal in the prior art, making it difficult to differentiate it from noise produced by other mechanisms. Accordingly, signal attenuation is known in the prior art to be a phenomenon to be avoided.

The outer diameter of suspension sleeve 2 must be large enough to restrict lateral movement of suspension sleeve 2 within enclosure tube 3, yet small enough to fit easily within the inner diameter of the enclosure tube 3, together with the return wire 1 as will be discussed below. Also, it may be possible to have the suspension sleeve 2 present without requiring the restriction of an enclosure tube 3, and the use of an enclosure tube 3 should not be considered limiting to the invention or even to the waveguide suspension. Overall, the waveguide 4 must be suspended in a manner that cushions it from shock and vibration stimuli so that associated erroneous responses are eliminated.

Suspension sleeve 2 includes an inner layer 27 and an outer layer 29. The fiber that makes up inner layer 27 of suspension sleeve 2 is non conducting and may be a fine, hard material, or a combination of materials such as ceramic or glass or metal or polymer. The strand count and weave configuration of such fiber are typically from eight to sixteen strands in diamond, regular, hercules or other weave pattern. Such strand, count and weave configuration enable the suspension sleeve 2 to act as a cushion between the waveguide 4 and the enclosure tube 3. Interior to the inner layer 27 and exterior to the waveguide 4, there is clearance 28 such that the inner layer 27 is loosely fitting around waveguide 4. The outer layer 29 of suspension sleeve 2 helps to maintain the shape of the inner layer 27, and isolate it from the enclosure tube 3. The outer layer 29 is typically a softer material, such as a silicone rubber and is a second layer of inner layer 27.

Suspension sleeve 2 ends at its remote side at end 31 facing toward the end plug 20. Juxtaposed with the end 31 of the suspension sleeve 2 is damping element 6. Damping element 6 is slipped over the end of the waveguide 4 and is coaxial with waveguide 4 and generally cylindrical in shape, as is suspension sleeve 2. However, the damping element 6 is not loose fitting over the waveguide 4, but is more constrictive over waveguide 4 in order to provide damping. Thus, as shown in FIGS. 2a and 2b, the inner layer 27 of damping element 6 snugly fits about waveguide 4. Further, the outer layer 29 of damping element 6 while usually of softer elastomer materials, such as silicone rubber, does not normally contact enclosure tube 3, as does outer layer 29 of suspension sleeve 2, but instead is sized to control the amount of and to exert pressure on the inner layer 27 which in turn exerts pressure on the waveguide 4. Thus, a space is left between the outer layer 29 of damping element 6 and the inner surface of enclosure tube 3.

In addition, a tuning wire 5 (see FIG. 2b) of a diameter ranging from 0.005 inches to 0.016 inches may be used to act as a wedge, thereby controlling the pressure of inner layer 27 on the waveguide 4. The tuning wire 5 is adjacent to waveguide 4 and extends substantially along and is enclosed by inner layer 27 of damping element 6. It is used to change the acoustic impedance of the damping element 6 but to do so gradually so that the sonic strain wave signal is dampened gradually along the distance of the waveguide 4 enclosed by damping element 6. In this way, no reflection will occur from sudden changes in impedance, but instead damping of the sonic strain wave amplitude along the damping element 6 will occur. It should be noted that the tuning wire 5 while only shown in FIG. 2b may be used with any of the configurations of FIGS. 2a–2d and may be used in any other kind of damping element for the purposes set out above.

Further, because damping element 6 is used to provide optimum damping of the sonic strain wave pulse traveling in the waveguide 4, and because proper acoustic matching of the waveguide 4 and the damping element 6 is determined by the pressure exerted on the waveguide 4 by the inner layer 27, there are other mechanisms besides the tuning wire 5 that can be used. As shown in FIGS. 2c and 2d, a damping element 6 for use over a broad temperature range could be used, comprising a short braided sleeve 8 of the sort of inner layer 27, but with such braided sleeve 8 inserted into a coaxial, larger diameter metal sleeve 9. This assembly of sleeves 8, 9 is slipped onto the end of the waveguide 4. The metal sleeve 9 may then be crimped such that the braided sleeve 8 contacts the waveguide 4 with sufficient pressure to provide the required damping action.

Thus, as seen through FIGS. 2a–2d, damping may occur through the pressure of outer layer 29 or through the tuning wire 5 trapped in inner layer 27 or through the crimping of metal sleeve 9 or by any other mechanism that applies the appropriate pressure to control the impedance matching along a predetermined length of the damping element 6 as determined by experiment.

The end 32 of damping element 6 facing end 31 of suspension sleeve 2 is preferably cut between a 40° and 50° angle and preferably about a 45° angle in order to properly match its impedance at that of the waveguide 4.

An additional way to minimize end refections from the damping element 6 is to place another damping sleeve 33 of dissimilar material or size or pressure in front of damping element 6 (toward the suspension sleeve 2). Damping sleeve 33 should be designed to have a closer acoustic impedance match to the waveguide 4. That is, it should have less pressure, or smaller outer diameter, or lower mass density than damping element 6, or if it is an elastomer, it should have a low durometer, such that the front end reflection is minimized. Damping sleeve 33 includes a face 34 facing toward face 32 of damping element 6. Face 34 normally has a plane substantially perpendicular to the longitudinal axis of the waveguide 4. It should be noted that damping sleeve 33 may be used with any of the damping elements 6 of FIGS. 2a, 2b, 2c and 2d, and the depiction showing it only in FIG. 2a should not limit its generality. Further, the orientation of face 34 will not change if damping sleeve 33 is used with the damping sleeves 6 of FIGS. 2b, 2c or 2d, each of which has a slanted face 32. The face 34 will continue to have a plane substantially perpendicular to the longitudinal axis of the waveguide 4. Generally, this damping sleeve 33 does not damp as efficiently as the damping element 6, but it will damp the reflection from the damping element 6, thereby lowering the overall sonic energy leaving the damping system, damping element 6 acting as the primary damp and damping sleeve 33 acting as a secondary damp.

Still another method of minimizing the front end reflection coming from the damping element 6 is to expand the inside diameter of the damping element 6 at the front end. The end facing suspension sleeve 2. This can be accomplished by inserting a flaring tool in such front end of the damping element 6 just prior to placing it on the waveguide 4.

Still another method for minimizing the front end reflection coming from damping element 6 is to remove material from the outside diameter on such front end of damping element 6. This removal region should be in the range of 0.125" to 0.5" as measured from such front end of damping element 6. This can be accomplished, for example, by using a set of wire strippers to remove part of the elastomer that overlaps the braid.

The return wire 1 must pass over damping element 6 as shown in FIGS. 2a, 2b and 2d, or through damping element 6 as in FIG. 2c. In FIG. 2c, the return wire 1 is insulated (as it may be in all other cases) and can also act in a manner similar to the tuning wire 5 of FIG. 2b. In all events, the return wire 1 must then be attached to the tip of the waveguide 4 using solder or a crimp ring 7, and must be electrically connected to form the rest of the circuit to support the current pulse which begins in housing 17 and flows through waveguide 4 to return through return wire 1, which may be arranged as discussed in U.S. Pat. No. 3,898,555 or any other way known or to be known in the art.

The pressure applied by the inner layer 27 may be substantially uniform, but may also be nonuniform with less pressure on the side facing the housing 17 and more pressure on the side facing the end plug 20 to shorten the length of the damping element 6 for a given damping effectiveness while preventing reflection.

Alternately, the return wire 1 may be braided into suspension sleeve 2 or enclosure tube 3 may be conductive and the return wire 1 may be connected electrically to enclosure tube 3. Otherwise, in assembly, the return wire 1 and suspension sleeve 2 are inserted into enclosure tube 3. The waveguide 4 is then pulled into the suspension sleeve 2 because suspension sleeve 2 is sized such that the waveguide 4 is in loose contact with it but does not allow excessive lateral movement. Further, the damping element 6 is then slipped over the waveguide 4.

Figure 14:
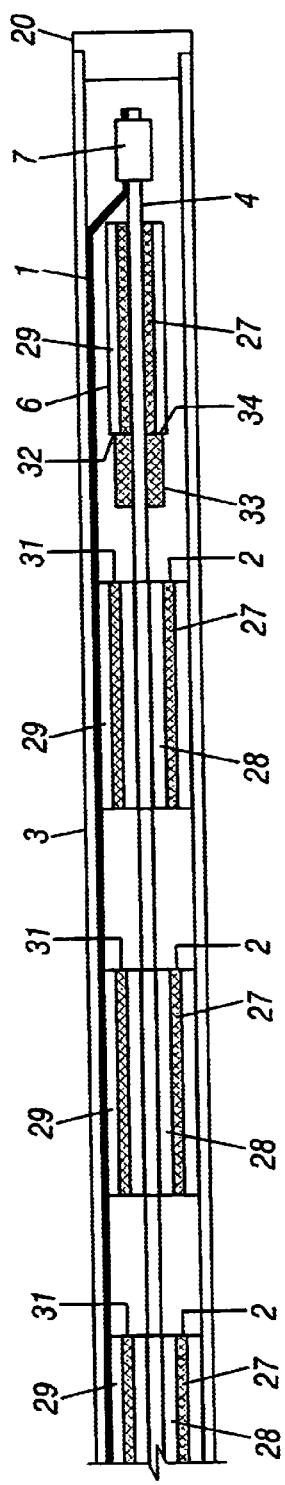
FIG. 14 illustrates a cross-sectional view of the sensing element assembly of an alternate embodiment of the present invention of FIG. 1 taken along section lines 2—2 of FIG. 1 showing a portion of the waveguide and surrounding partial sleeves and showing the damping element at the end of the waveguide.

Further, a series of short suspension sleeves 2 may be located along the length of waveguide 4, instead of a single continuous suspension sleeve 2, as shown in FIG. 14, although this is an alternate embodiment and believed to be more difficult to construct. In such a series, care should be taken in the spacing to decouple or otherwise suppress external or internal mechanical noise.

Figure 4:
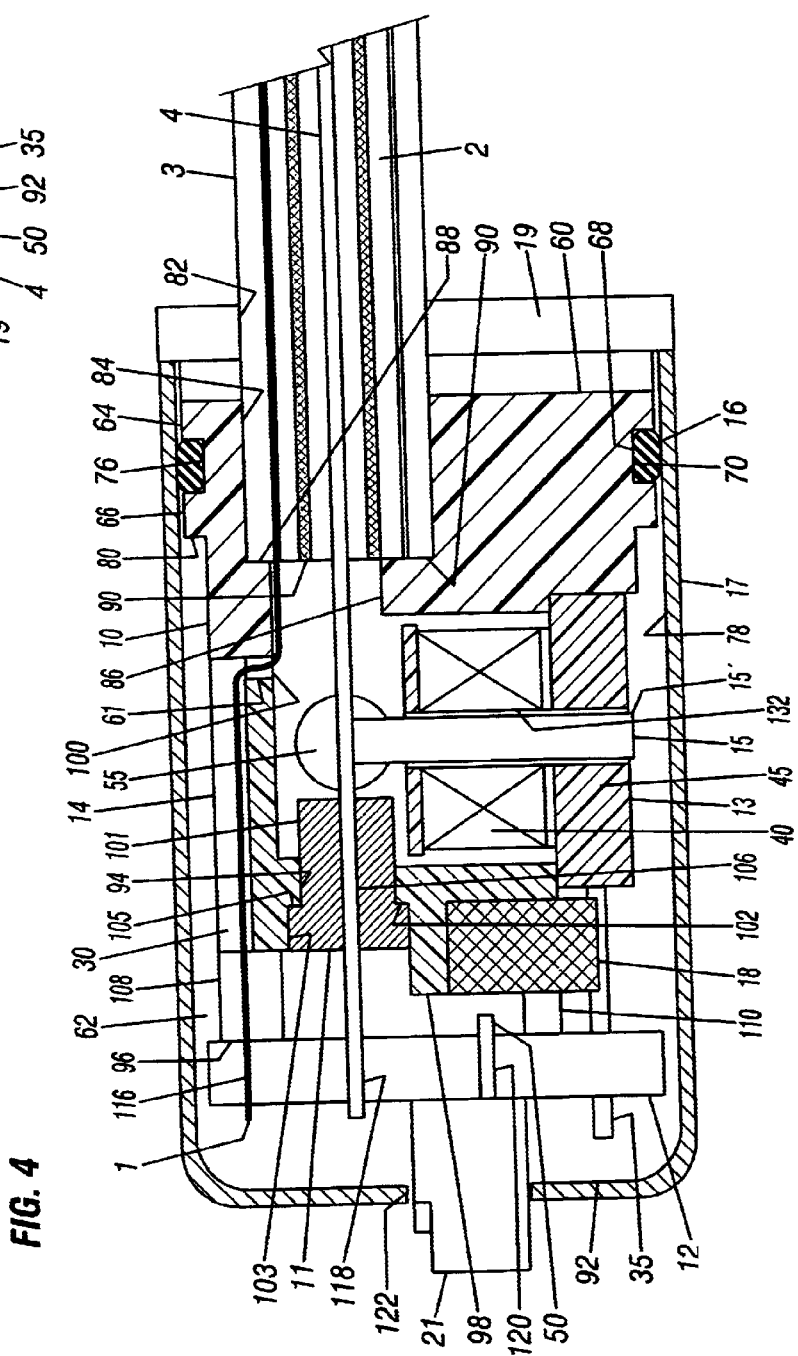
FIG. 4 is a cross-sectional view of the sensing element assembly of the preferred embodiment of the present invention of FIG. 1 taken along section lines 4—4 of FIG. 1 showing the cross-section of the housing and a portion of the waveguide and surrounding sleeves but not showing the damping mechanism.
Figure 11:
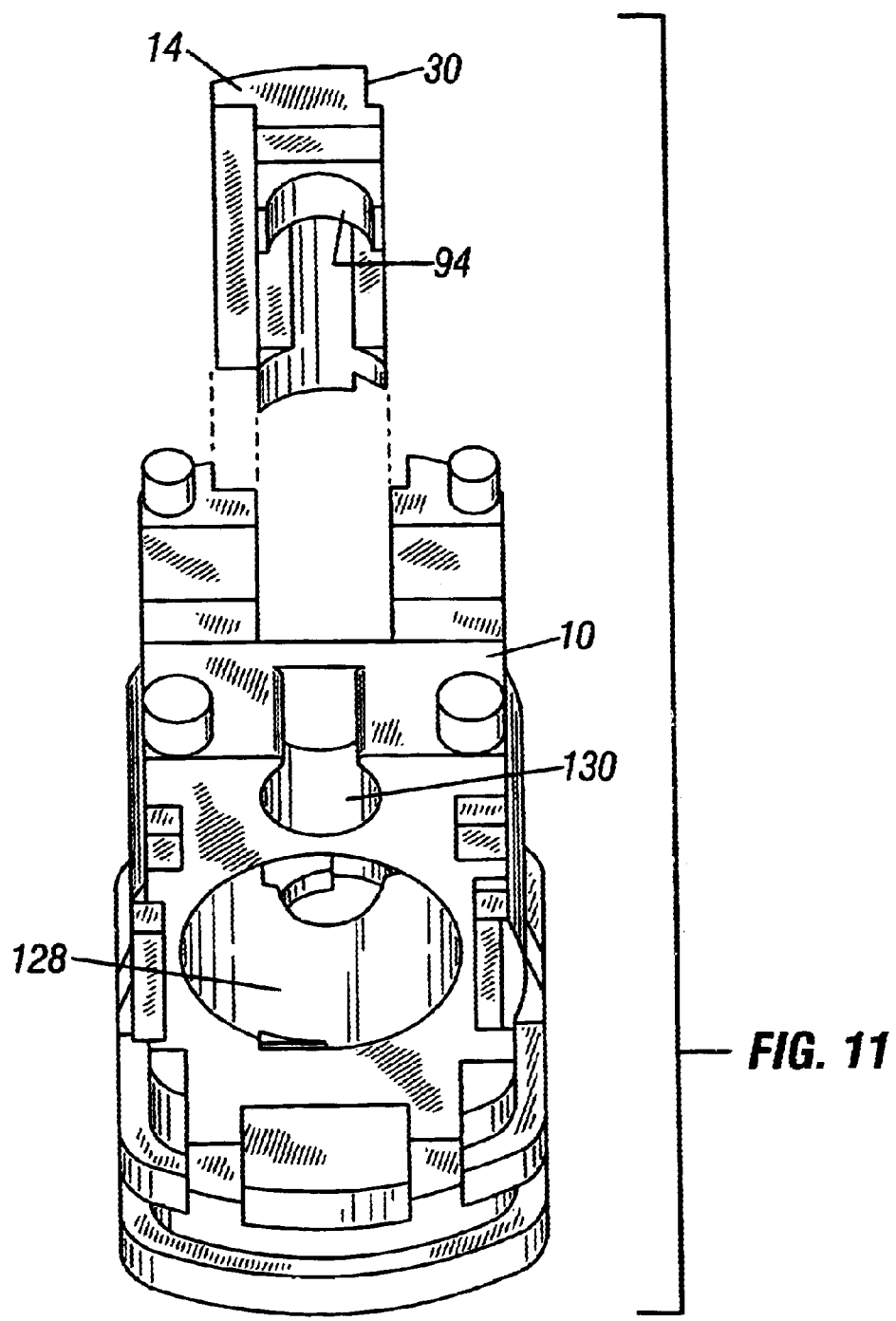
FIG. 11 is a view in profile of the end opposite to the end of FIGS. 9 and 10 of the bracket of the preferred embodiment of the present invention showing the bracket cover juxtaposed to it.
Figure 12:
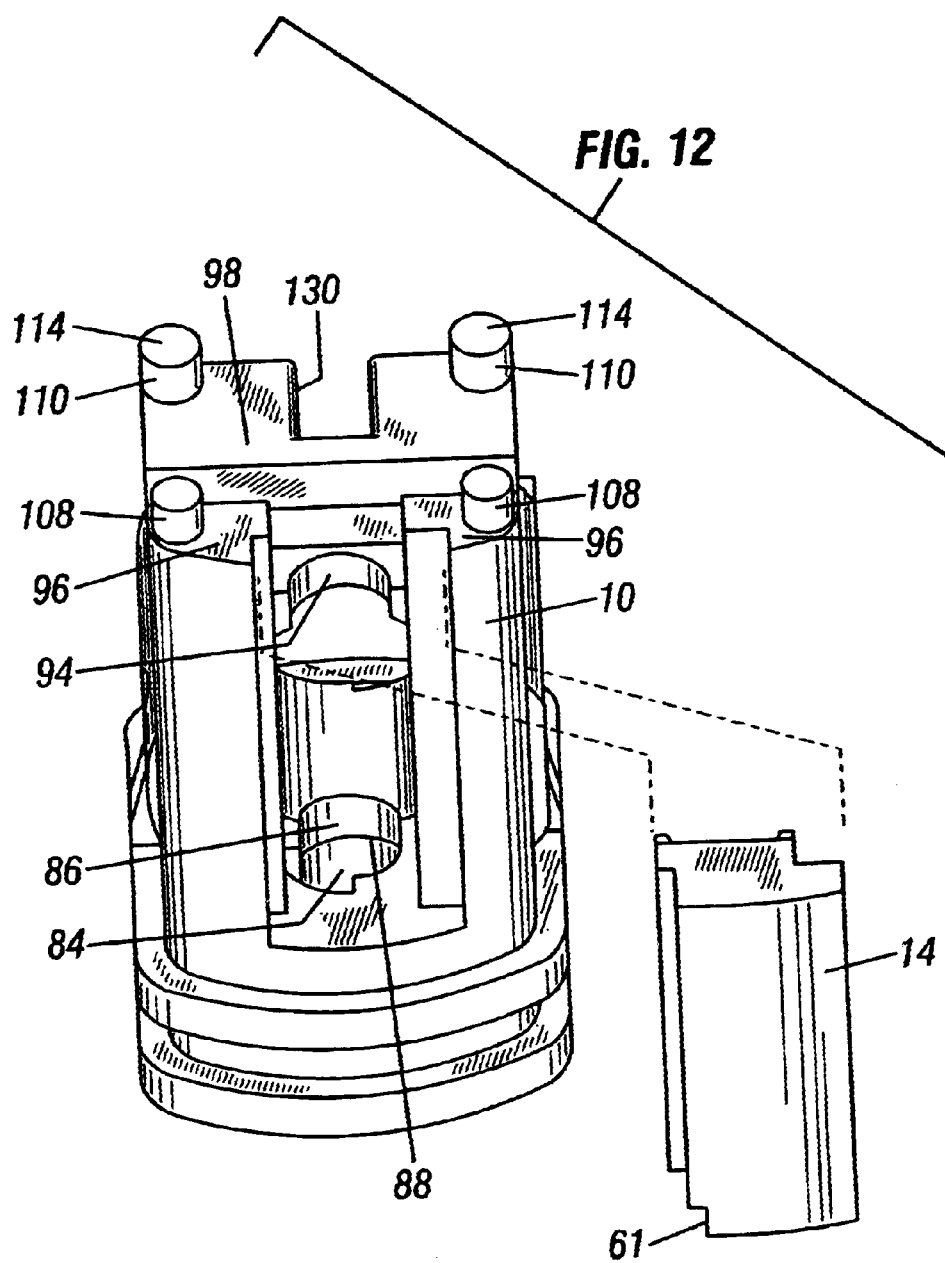
FIG. 12 is a different side view of the profile of the bracket of the preferred embodiment of the present invention.

Return wire 1, suspension sleeve 2, enclosure tube 3 and waveguide 4 are supported in housing 17 by a bracket 10 (FIG. 4) preferably made of plastic. The details of the bracket 10 are shown in FIGS. 5–12. Bracket 10 includes a base 60, the outer diameter of base 60 being substantially equal to the inner diameter of the main enclosure 62 of housing 17. Base 60 includes two flanges 64, 66 located on either side of a recess portion 68 of base 60. This arrangement permits a groove 70 (FIG. 4) to be present between the two flanges 64, 66. A seal ring 16 is located inside groove 70 sealingly engaging the sidewalls 72, 74 (FIG. 7) of flanges 64, 66, respectively, and the outward facing wall 76 of recess 68, as shown in FIG. 4. As used above, the word "diameter" does not imply a circular shape. As best seen in FIG. 4 and from the shape of flanges 64, 66, the interior 62 of housing 17 is more rectangular in shape with two curved opposing sides. Thus, with the shape and sizing of flanges 64, 66, seal ring 16 also contacts the interior sidewall surface 78 of the main enclosure 62 of housing 17. Therefore, seal ring 16 acts to seal wiring and connectors interior in housing 17 to surface 80 of flange 66 (FIG. 4 and FIG. 9).

The end of housing 17 is closed by flange 19. An opening 82 is formed in flange 19 and sized to permit enclosure tube 3 to snugly fit through opening 82 and extend into an opening 84 formed in flanges 64, 66 and recess portion 68 of base 60 which is coaxial with opening 82 and of the same size as opening 82. Base 60 also includes a second opening 86 formed adjacent to flange 66 and coaxial with opening 84 but of smaller diameter than opening 84, thereby forming a shoulder 88 between openings 84, 86 against which abuts end 90 of the combination of suspension sleeve 2 and enclosure tube 3.

Bracket 10 further includes an extension 91 (FIG. 7) that extends beyond base 60 toward the end surface 92 of enclosure or housing 17. Extension 91 includes an intermediate opening 94 spaced between opening 86 and the end surface 96 of bracket 10 and end 98 of bracket 10. Opening 94 is coaxial with openings 84, 86. Opening 94 is also partially formed by bracket cover 14 (FIG. 8). In forming such opening 94, a lateral opening 100 is formed by the clearance between bracket 10 and a notch 61 in bracket cover 14. Opening 100 connects the interior between opening 94 and opening 86 with a channel 30, formed in bracket cover 14.

With the combination of suspension sleeve 2 and enclosure tube 3 abutting or otherwise terminating at shoulder 88, both the return wire 1 and the waveguide 4 extend from end 90 into the space interior to housing 17. Return wire 1 is caused to pass through opening 100 and into channel 30 with a specific alignment described below. Waveguide 4 continues coaxial with opening 94 and is anchored by a waveguide anchor 11, preferably made of brass. Waveguide anchor 11 has a cylindrical shaped lower end 101 of diameter sufficient to fit into opening 94. A larger substantially rectangular cap 103 forms the top of waveguide anchor 11 with shoulder 105 formed therebetween. Shoulder 105 rests on surfaces 102, 104 (FIG. 6) which form the upper or inner facing surface of opening 94. Another opening 55 is provided in extension 91 whose axis is at right angles to the axis of openings 84, 86, 94 (FIG. 10). The identical opening 55 is formed in the other side of the extension 91 as shown in FIG. 7. The waveguide anchor 11 is sized such that in its seated position with surface 105 in contact with surfaces 102, 104, anchor 11 does not extend over opening 55. Waveguide anchor 11 further includes a central opening 106 coaxial with the axis of suspension sleeve 2 and waveguide 4. Opening 106 is sized to permit the insertion of waveguide 4 through it.

Figure 3:
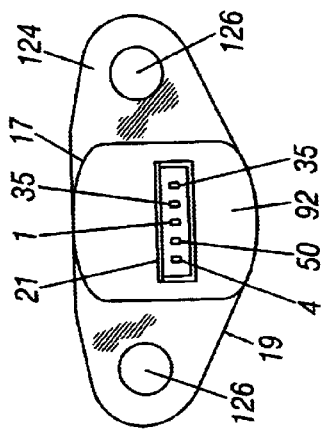
FIG. 3 depicts an elevated end view of the housing which shows the connector.

Cylindrical shaped elements 108, 110 extend from surface 98 and face toward the end 92 of housing 17. The upper surface 114 (FIG. 5) of cylindrical member 110 is substantially coplaner with the end surfaces 96 and act as supports for a printed circuit board 12 mounted near end 92. Cylindrical shaped elements 108 extend from surfaces 96 and engage reciprocally located features (not shown) in circuit board 12 to locate and align circuit board 12. Printed circuit board 12 is equipped with a series of openings 116, 118 and two not shown to permit return wire 1 to pass through opening 116 and waveguide 4 to pass through opening 118 and two additional leads from a pickup coil 13 yet to be discussed. In addition, printed circuit board 12 has openings 120 that permit leads 50 to pass from connector 21 through printed circuit board 12. Thus, return wire 1, waveguide 4, a dummy lead 50 and leads 35 of pickup coil 13 (yet to be discussed) all pass through printed circuit board 12 and are electrically connected by printed circuit board 12 with electrical connector 21 as five leads 50 (FIG. 3). Connector 21 physically rests on printed circuit board 12 and extends from it through an opening 122 formed in the end 92 of housing 17 to make connector 21 available to customers or users as shown in FIG. 3. Housing 17 is closed by flange 19 which may also include extensions 124 having openings 126 therethrough for mounting housing 17 in the customer's or user's device.

As shown in FIG. 7, two additional openings 128, 130 are included in extension 91 of bracket 10. The axis of each opening 128, 130 is perpendicular to the axis of the other openings discussed above. Opening 128 is larger than opening 130 and is sized to admit a pickup coil 13 (FIG. 4). Pickup coil 13 may be any type coil and is shown preferably with a high wire winding count but may be of any design without limiting the generality of the invention. The pickup coil 13 is shown in FIG. 4 as having copper windings 40 mounted on a bobbin base 45. Two leads 35 extend from pickup coil 13 through printed circuit board 12 where they are electrically connected as discussed above. Pickup coil 13 is mounted coaxially about a tape 15 reciprocally mounted in an opening 132 in pickup coil 13. Tape 15 extends from substantially the end of bobbin 45 facing outward towards housing 17 through the pickup coil 13 and to the waveguide 4 where it is connected to waveguide 4 by welding or other method of mechanical connection. Tape 15 does extend for a length 15' beyond the end of the bobbin 45. This length 15' provides constructive interference to the signal. The signal is developed as a voltage across the coil 13. The constructive interference is produced by the sonic wave continuing past the coil 13, reflecting from the end of tape 15, including all of the length 15' and arriving back at coil 13 with such time delay as to produce an additive effect. This causes constructive interference for any type of tape 15 or circuitry with respect to the coil 13. An anchor or bracket for the end of tape 15 could alternately be used to set the length 15'. Tape 15 is typically made of a ferromagnetic or magnetostrictive material and may be of the same material as the waveguide 4 but have a different metallurgical treatment. Opening 128 is thus located in close proximity to channel 30 to place the pickup coil 13 in close proximity to return wire 1, thereby permitting a reduction in energy of the input pulse to waveguide 4.

Opening 130 is sized to receive a bias magnet 18 or unmagnetized magnet material which could be installed for later magnetization during the assembly process.

For assembly of the waveguide assembly into housing 17, the waveguide 4 is placed into the waveguide anchor 11 after suspension sleeve 2, waveguide 4 and enclosure tube 3 had been inserted into the openings 82, 84 of flange 19 and bracket 10. After the waveguide 4 is inserted into anchor 11, it is connected to the printed circuit board 12. The suspension sleeve 2 and enclosure tube 3 are held in place in the bracket 10 with adhesive or by suitable retaining elements not shown.

After the waveguide 4 is placed into the brass waveguide anchor 11 and connected to the printed circuit board 12, the pickup coil 13 is added. The return wire 1 is held in place while the bracket cover 14 is installed and then the tape 15 is welded or otherwise mechanically connected onto the waveguide 4 using openings 55. It is not necessary to attach the tape in the sequence set out above and the sequence should not be considered as limiting for all the inventions disclosed. The bias magnet 18 is then installed, or as indicated above unmagnetized magnetic material could have been installed earlier and then magnetized. Finally seal ring 16 is placed into groove 70 of bracket 10. Thereafter, the bracket 10 and the waveguide 4 and the flange 19 (if the flange 19 is used) as an assembly is inserted into the housing 17. The housing 17 is crimped and/or welded in place. Finally, the air inside the device is displaced by a dry, unreactive gas, and the end plug 20 is held in place with adhesive or other means.

The distance and location of return wire 1 with respect to waveguide 4 can be adjusted in any appropriate manner to permit the magnetic fields induced in these two wires to cancel each other. In addition, by properly routing return wire 1 in the area immediately adjacent the pick up coil 13, the ringing of the interrogation pulse can be reduced significantly, such as fifty percent or more. The size and magnetic properties, such as using copper of the sizes set out above for tuning wire 5 also have an effect on the ringing.

Transducer 25 is produced in one inch incremental lengths or some other incremental length on the order of one-half inch to four inches. This is done to reduce the total number of unique lengths to which waveguide 4, suspension sleeve 2, return wire 1, and enclosure tube 3 must be cut. This reduces the cost and complexity of manufacturing transducer 25, yielding a more cost effective product. Complete sensor assemblies which utilize transducer 25 can be manufactured in any length or incremental length desired. This is accomplished by providing a mounting means for transducer 25 within the complete sensor assembly which allows transducer 25 to be positioned axially at any point within ±½ inch of its median position within the complete sensor assembly. A transducer 25, the length of which is within ±½ inch of the length desired for the complete sensor assembly, can thus be positioned within the complete sensor assembly to provide precisely the sensing length desired.

Figure 13:
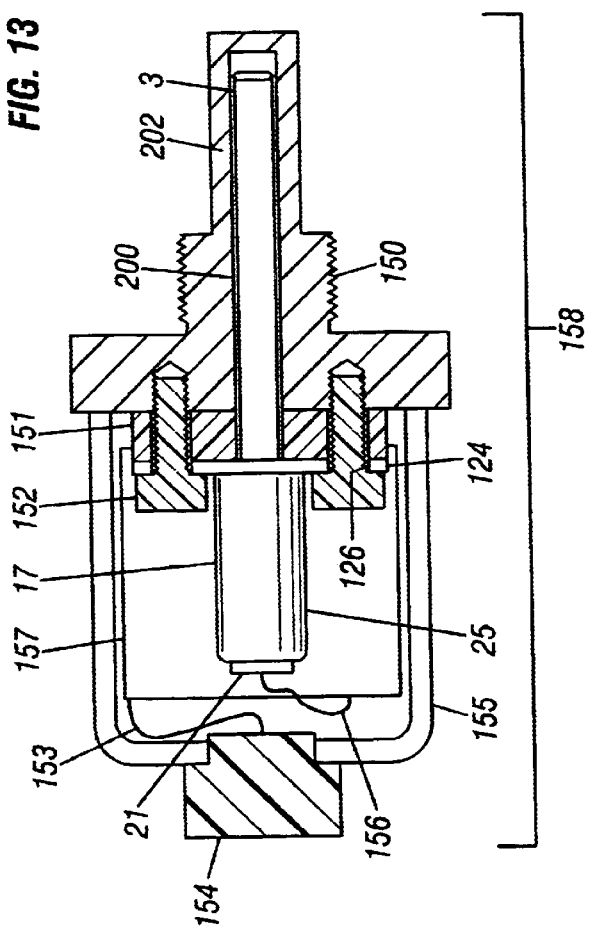
FIG. 13 illustrates a cross sectional view of a sensor assembly using the transducer of the preferred embodiment of the present invention.

FIG. 13 illustrates one possible implementation of the mounting means for using transducer 25 in one inch incremental lengths (or some other incremental length on the order of one-half inch to four inches) to produce sensor assemblies 158 in any length desired. Sensor assembly 158 includes a sensor cartridge housing 150 having an endcap 155. Transducer 25 is secured to sensor cartridge housing 150 using screw fasteners 152 passing through openings 126 in extensions 124 of mounting housing 17 or other suitable attachment means. When necessary to achieve a proper fit, a spacer block 151 may be positioned between transducer 25 and sensor cartridge housing 150. Spacer block 151 is utilized in a variety of thicknesses or is not used at all depending on the sensing length required of sensor assembly 158 and the standard length of the enclosure tube 3 containing waveguide 4 supplied as part of transducer 25. Fasteners 152 are also used in a variety of lengths to correspond to the thickness of spacer block 151. Transducer 25 is shown in FIG. 13 in the middle of the range of movement possible within endcap 155. Wire harness 156 carries signals and supply voltages between transducer 25 and customer or vendor supplied electronic circuit board 157. Wire harness 156 is of sufficient length and flexibility to allow transducer 25 to be secured anywhere within the allowed range of positions after being connected to electrical connector 21. Electronic circuit board 157 (FIG. 13) provides the interrogation and signal conditioning circuitry, as known in the art, necessary to communicate with the end user system and to provide the desired position feedback signals. A wire harness 153 is connected to the electronic circuit board 157 (FIG. 13) and carries signals and supply voltages between electronic circuit board 157 (FIG. 13) and an external connector 154 attached to endcap 155. External connector 154 provides the physical means for connecting to the end user system (not shown).

All of the features of a particular preferred embodiment of the waveguide assembly are not shown in the above disclosure in order to emphasize the generality of the disclosure. For example, a buffer circuit may be used to prevent coil saturation of pickup coil 13 when the pulse is initially introduced along waveguide 4. Such a circuit would help more closely couple the tape 15 and coil 13 to the waveguide 4.

Further, the transducer disclosed in this application may be fully electrically isolated or shielded including electrically shielded by housing 17 from all devices in which it is mounted by having mounting or spacer block 151 and screw fasteners 152 made of nonconducting material and having an insulating material 200 between tube 3 and external extension tube 202.

The transducer 25 assembled as a sensor element is enclosed in a sensor cartridge indicated generally by indicator 350, indicator 350 indicating the entire one-piece or explosion proof assembly which would include sheath 300 and its assembly with the opening 360 of cartridge 350 as an integral attached assembly as discussed in more detail below. Sensor cartridge 350 (FIG. 16) is an application package as an installable unit and includes an elongated waveguide assembly. Because of the modular nature of the assembled transducer 25, the sensor element 25 may be interchanged with various electronic assemblies, and can be used in or as an explosion proof housing. The waveguide assembly is enclosed in an enclosure tube 3 which passes through a cylindrical opening 370 formed by walls 371 of isolator/plug 310. Walls 371 are enclosed by an opening 375 formed in a thick front end section 340 of cartridge 350.

Enclosure tube 3 is enclosed in a sheath 300 inserted into an opening 360 of front end section 340 which abuts and is coaxial with opening 375. Front end section 340 is thick to permit adequate alignment of sheath 300 and ease of welding. An RTD (not shown) may also be enclosed by enclosure tube 3 from which RTD wires 320 extend from such RTD. Enclosure tube 3 and the waveguide assembly are mechanically supported at one end by a housing 17 mechanically connected to the waveguide assembly which, as set out above, is supported by tube 3 extending through the end of isolator/plug 310 which abuts the end surface of housing 17. Opening 370 is sized to permit enclosure tube 3 to snugly fit through the opening 370. Isolator/plug 310 is not attached to thick front end section 340 but merely has walls 371 inserted into opening 375. End 372 of isolator/plug 310 abuts interior end wall 335 of thick front end section 340. If potting material is used for explosion proof applications, the potting material, as discussed below, will hold the isolator/plug 310 in place. Otherwise, isolator/plug 310 would be attached to 340.

The waveguide assembly includes the outer enclosure tube 3 surrounding a coaxial elongated interior waveguide. Typically, a magnet (not shown) is mounted on the sheath 300 by being placed over and coaxial with sheath 300. The magnet interacts with a current pulse as more completely described in U.S. Pat. No. 3,898,555. The type of magnet used and the type of application used is not shown, and may be any application.

Figure 15:
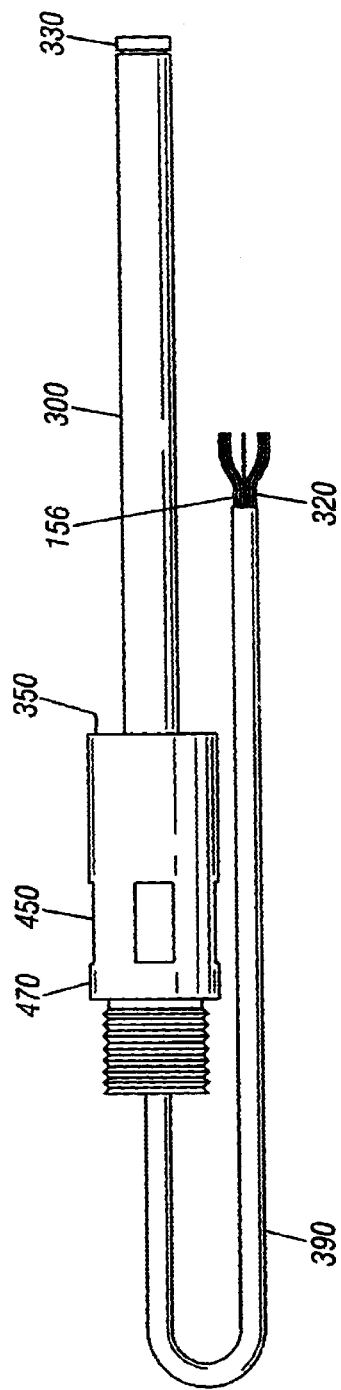
FIG. 15 is an elevated view of the sensor cartridge of the preferred embodiment of the present invention.
Figure 17:
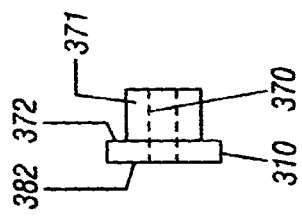
FIG. 17 is a side view, partly in phantom line, of the isolator/potting plug of the preferred embodiment of the present invention.
Figure 16:
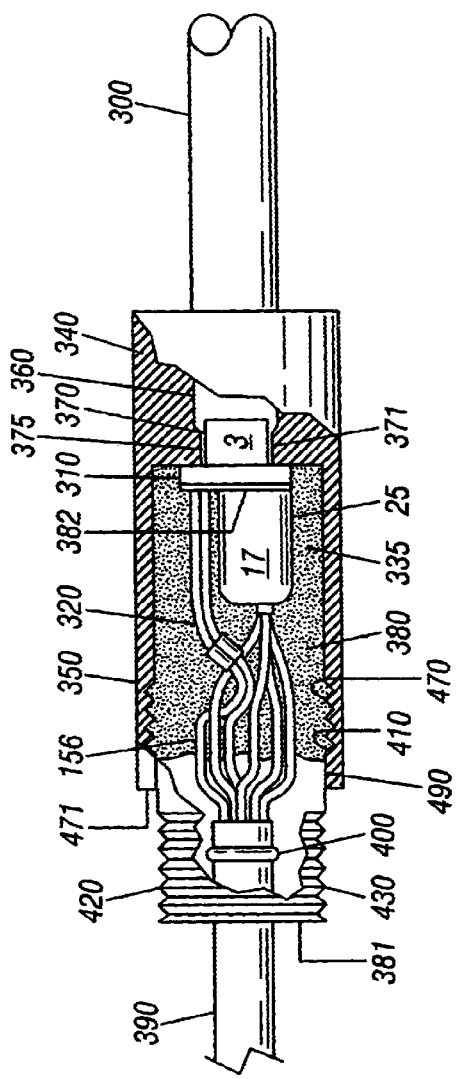
FIG. 16 is a partial sectional view of a portion of FIG. 15, showing the modularly constructed pre-assembled sensing element amid the potting.

The end portion of enclosure tube 3, that is remote from housing 17, is shown in cross-section in FIG. 16 and ends with an end plug (not shown). Sheath 300 extends beyond the end of enclosure tube 3 and ends with an end plug 330 (FIG. 15). An inert gas may be introduced in enclosure tube 3 to further promote isolation and sealing. End plug 330 acts to stop fluid and other materials from entering enclosure tube 3.

Enclosure or housing 17 is located in a cylindrical opening in the interior of sensor cartridge 350. Opening 380 extends interiorly from interior wall 335 of the housing to opposing end 381. Enclosure 17 extends into interior 380 from the interior facing wall 382 of isolator/potting plug 310 to the interior face 381 of threaded end 420 of sensor cartridge 350 which contains exit conduit or cable jacket 390. RTD wires 320 extend from isolator/potting plug 310 through the interior 380 of sensor cartridge 350 and through exit conduit or cable jacket 390. Conductors 156 extend from housing 17 through the interior 380 of sensor cartridge 350 and through exit conduit 390. Exit conduit 390 may include, and for explosion proof installations would include, strain relief ring 400 to remove the possibility of the customer pulling out the cable.

For explosion proof installations, the interior 380 of sensor cartridge 350 is filled with a potting compound 410, such as SYLAST 2651 with Catalyst #9, for an explosion proof seal. The interior of the end 420 of sensor cartridge 350 is filled to face 381 with a waterproof potting compound from which extends conduit 390. End 420 is threaded by threads 430 adapted to be attached to a user housing (not shown) containing appropriate electronics.

Threads 470 terminating at cut back 490 are formed in interior 380 of sensor cartridge 350. Threads 470 and cut back 490 are formed adjacent to end 471 of the main body portion of sensor cartridge 350. The threads 470 and cut back 490 should be of sufficient depth to hold the water proof potting compound 410 in place so that it cannot be forced out, such as around exit conduct 390 by pressure applied through the process, such as through sheath 300.

Detents 450 are formed in the external portion of the main body of sensor cartridge 350 to facilitate screwing the body portion of sensor cartridge 350 into an exterior explosion proof housing (not shown) which may also be explosion proof.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed as invention is:
1. An explosion proof magnetostrictive probe for use for detecting liquid in a container, comprising:

a preassembled magnetostrictive sensor element having detection means for detecting the level of the liquid in the container, including a level sensing area;

an explosion proof housing having an exterior and interior and interior surface;

first means for mounting said sensor element, including said level sensing area and said detection means, in said interior of said housing;

potting material, said potting material located in said interior of said housing, substantially filling said housing about said sensor element except the portion of said housing containing the level sensing area of said sensor element; and second means for anchoring said potting material in said housing.

2. The probe of claim 1, wherein there is further included a conduit, said conduit mounted in said interior of said housing opposite said sensor element, said conduit extending from said interior of said housing to said exterior of said housing.

3. The probe of claim 2, wherein said sensor element is located wholly in said interior of said housing, and there is further included a conduit mounted in said housing, said wires extending interiorly from said sensor element through said conduit.

4. The probe of claim 1, wherein said first means includes an isolator plug mounted between said sensor element and said housing.

5. The probe of claim 1, wherein there is further included an isolator plug mounted between said sensor element and said housing, and wherein said sensor element includes a waveguide, said isolator plug includes a cylindrical central opening, and said housing includes a thick front end portion having an opening therethrough coaxial with said cylindrical central opening, said waveguide extending through said cylindrical central opening and said thick front end portion opening.

6. The probe of claim 5, wherein there is further included an external sheath as part of said housing, said waveguide extending into said sheath and said sheath being mounted in a portion of said thick front end portion opening and extending exteriorly therefrom.

7. The probe of claim 6, wherein said sheath includes an end extending from said housing, said end having an end plug.

8. The probe of claim 1, wherein said housing has a first end and said sensor element is mounted at said first end and said housing includes a second end, said housing and said second end terminating at a cut back, said cut back forming a portion of said second means.

9. The probe of claim 8, wherein there is further included threads on said interior surface, said threads being interior to said cut back, said threads forming a portion of said second means.

10. The probe of claim 1, wherein said housing includes a thick front, first end portion and a second end and there is further included waterproof material in said second end and abutting said potting material, said waterproof material being located between said potting material and said surface of said second end.

11. The probe of clam 1, wherein said housing includes a conduit, said conduit includes strain relief.

12. The probe of claim 1, wherein said housing is made of weldable metal.

13. The probe of claim 1, wherein the probe is for isolating a sensor measuring the level of liquid in a container from signal processing circuitry and wherein said sensor element forms a module with said explosion proof housing and is removeably connected to the signal processing circuitry.

14. The probe of claim 1, wherein said housing has exterior, spaced apart, longitudinally extending flat portions.

15. The probe of claim 1, wherein said second means includes a groove.

16. The probe of claim 1, wherein said second means includes a thread.

17. The probe of claim 1, wherein said explosion proof housing is a one piece housing.

* * * * *